Feb. 14, 1950 R. SPIGEL 2,497,241
ELECTRIC BROILER
Filed June 6, 1947 3 Sheets-Sheet 1

Inventor
Robert Spigel

By Clarence A. O'Brien
and Harvey B. Jacobson
Attorneys

Feb. 14, 1950 R. SPIGEL 2,497,241
ELECTRIC BROILER
Filed June 6, 1947 3 Sheets-Sheet 2

Inventor

Robert Spigel

By *Clarence A. O'Brien and Harvey B. Jacobson*
Attorneys

Feb. 14, 1950 R. SPIGEL 2,497,241
ELECTRIC BROILER
Filed June 6, 1947 3 Sheets-Sheet 3

Inventor
Robert Spigel

Patented Feb. 14, 1950

2,497,241

UNITED STATES PATENT OFFICE 2,497,241

ELECTRIC BROILER

Robert Spigel, Lynn, Mass.

Application June 6, 1947, Serial No. 753,022

7 Claims. (Cl. 219—35)

This invention relates to an improved broiler, and the object thereof is to provide a novel and simple broiler of somewhat the usual type, but provided with a door opening, preferably in the form of a sliding door, which makes it possible that the same may be used as an electric stove for cooking purposes and as means for storing utensils so that by opening the door or sliding panel, it is possible to place therein small utensils such as frying pans, which would not be possible if there were no opening in the side wall.

Another object of the invention is to provide a broiler including a top section in the form of a heating element, which may be separated from the bottom section so that the broiler top can be removed and then inverted so that it becomes a sort of an electric stove with the heating element at the bottom.

Another object of the invention is to provide a broiler including an annular bottom section or base and a top section removably mounted thereon and including a detachable heater element therein, permitting convenient assembly and cleaning of the broiler and in which the upper section is provided with a sliding door or panel in one side, so that when the removable top section has been placed on the bottom of the broiler, the sliding door makes it possible to watch the broiling meat or toast without lifting the top, and also enables the user to turn over the meat or toast without lifting or removing the top portion of the broiler, while the top section may be removed from the bottom section and inverted so that the same may be used as an electric stove with a hot plate or heating element at the bottom for frying and other cooking purposes, separate and apart from the bottom section which is provided with a grate for broiling purposes when the top section is mounted on the bottom section, the door, when open, being adapted to permit the handle of a frying pan or other cooking implement to extend therethrough when the top section is inverted for use as a stove, to facilitate cooking of various articles of food on the heating element or hot plate in this position.

Other objects and advantages reside in the details of construction and operation as more fully hereinafter described and claimed, reference being had to the accompanying drawings forming part hereof, wherein like numerals refer to like parts throughout, and in which:

Figure 1:
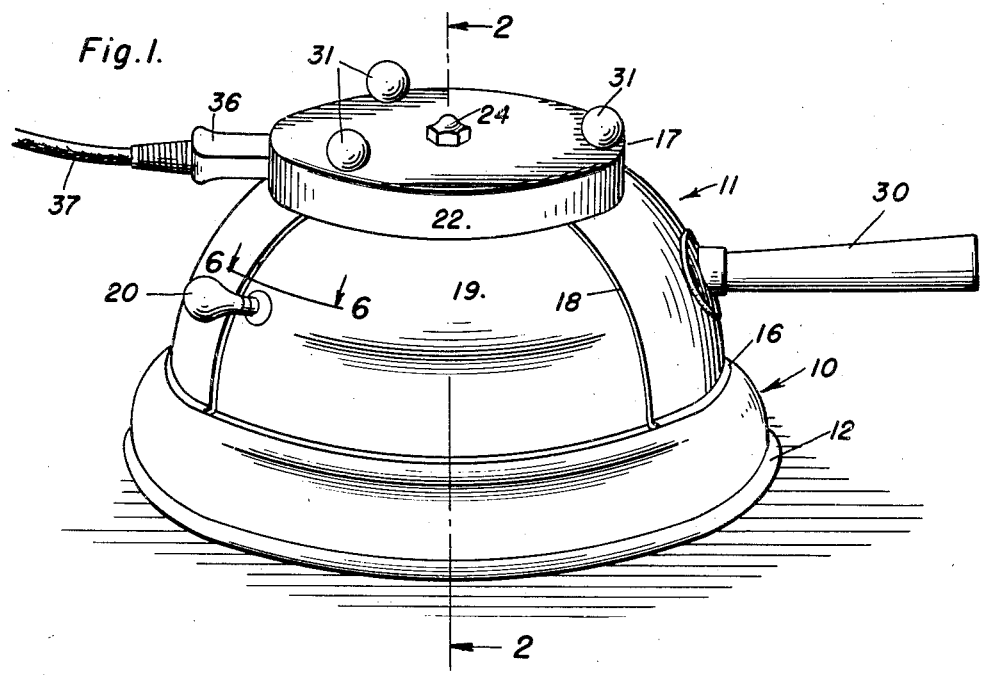
Figure 1 is a perspective view of an improved broiler constructed in accordance with the invention.

Referring to the drawings in detail, in which like reference characters designate corresponding parts throughout the several views, the improved broiler is shown as comprising a bottom section 10 and a top section 11 removably mounted thereon, the bottom section comprising an annular metallic member or the like open at the top, enlarged toward the bottom and provided with a rolled supporting edge or bead 12 at the bottom which is open and of concavo-convex cross section, with the concave side inwardly and the convex side outwardly and formed with an annular inwardly extending flange or depressed seat 13 at the top within its top edge. This seat 13 extends inwardly in the form of a flange, and is curved arcuately downwardly and inwardly, as more particularly shown in Figure 2 of the drawings, to provide a concaved recess 14 at the inside and top thereof freely open at the inside and with an upturned stop shoulder or flange at the outside formed at its juncture with the wall of the bottom annular section 13 and rolled, pressed, cast or otherwise formed therewith. The top of the lower section 10 is also freely open, and within the same, parallel or other grate bars 15 are provided upon which meat, toast, or other articles may be disposed for broiling, roasting or toasting.

The upper section 11, which is substantially of the same cross-sectional shape as the bottom section or base 10, but deeper and smaller than the latter, is open at the bottom and provided with a thickened portion or bead forming an outwardly directed annular flange 16 at the bottom adapted to removably engage or rest upon the seat 13 and conforms substantially to the contour of the bottom section or base 10 in this position.

Figure 4:
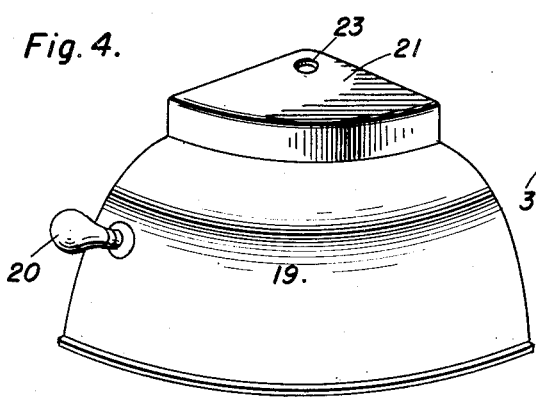
Figure 4 is a detached perspective view of the sliding or swinging door.
Figure 5:
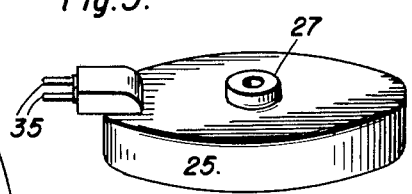
Figure 5 is an inverted detached view of the heating element or hot plate.
Figure 6:
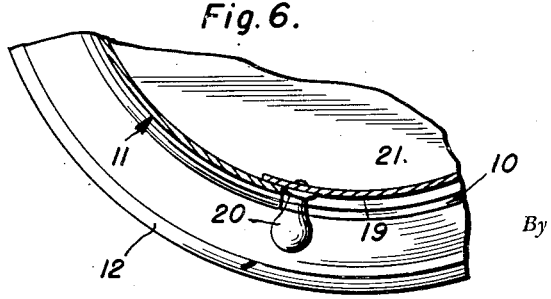
Figure 6 is a fragmentary sectional view taken on the line 6—6 of Figure 1.

The top is provided with a relatively flat, annular and circular portion 17 closing the top of the upper section 11, beneath which the latter section may be provided at one side with an opening 18 adapted to receive a segmental sliding panel or door 19 therein within the wall of the section 11 and of substantially the same cross-sectional shape. The opening 18 enlarges downwardly in segmental shape and the removable sliding segmental door section or panel 19 is slightly larger than opening 18 and fits within the lateral wall of the upper section 11 and its outwardly directed bottom bead or flange slidably rests upon the seat 13 inwardly of the normal wall of the section 11, as shown especially in Figures 1 and 2 of the drawings, and is provided with an outwardly extending handle 20 by which it may be slid to open and close the same. The sliding door or panel 19 is of segmental shape, as shown in Figure 4 of the drawings, so as to provide a similarly shaped top wall 21 which fits within and beneath the circular top portion 17 of the top or upper section 11 with its depending lateral portion fitting within and beneath the annular depending side or lateral flange portion 22 of the circular portion 17 of the top section 11 while mounted to slide within the wall of the top section 11 on the seat 13 inwardly thereof, as shown at the left-hand portion of Figure 2.

The segmental top portion 21 of the door or panel 19 is provided with an opening 23 near the apex of the top portion 21, to take a bolt or other pivot fastening 24 which extends through a similar hole in the portion 17 at the axial center thereof and, at the same time, serves to support a circular heating element or hot plate 25 by extending the bolt 24 therethrough at the center, as indicated at 26, and through a central reduced projecting portion or bead 27 at the top of the heating element or hot plate 25, which may be of metal, containing the resistance wire or heating element proper 28 embedded in dielectric or other suitable ceramic or fire-brick composition 29 therein and in the form of a flanged disk or circular pan disposed in inverted position when the device is assembled as a broiler.

Figure 2:
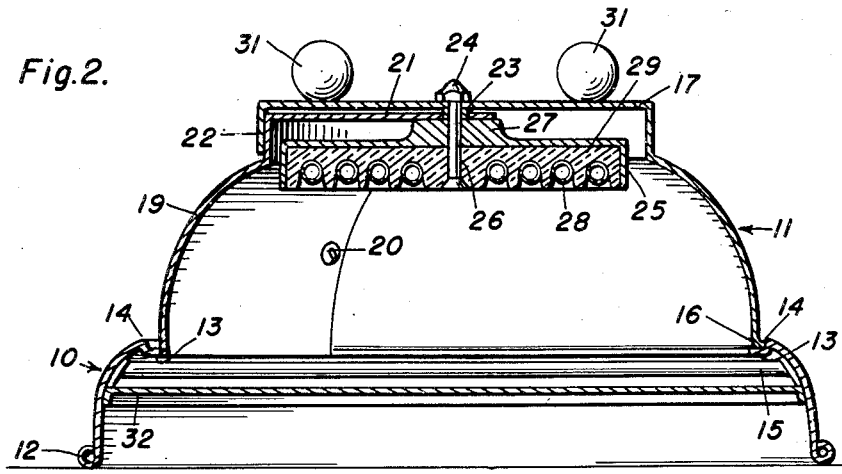
Figure 2 is a diametrical vertical sectional view of the broiler taken on the line 2—2 of Figure 1.
Figure 3:
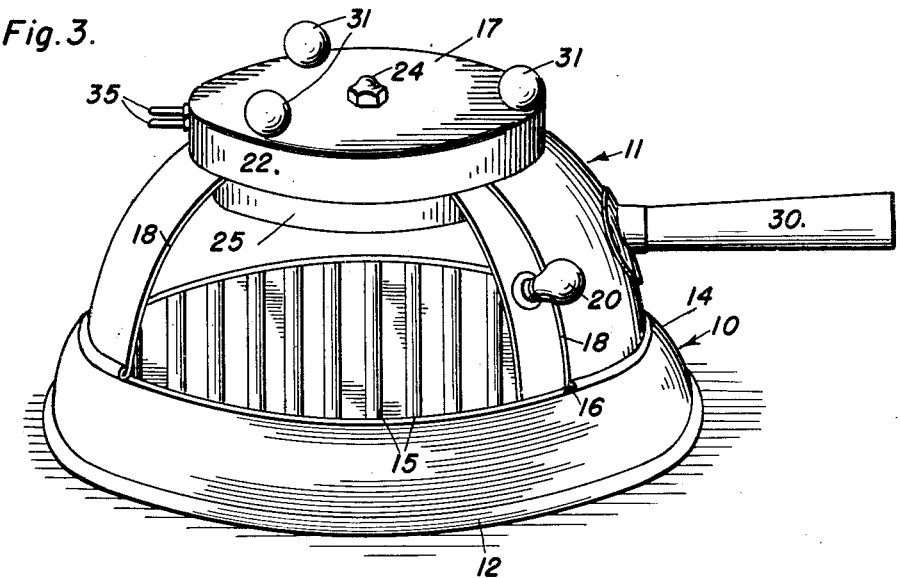
Figure 3 is a view similar to Figure 1 with the door open, as distinguished from the closed position of the door in Figure 1.
Figure 7:
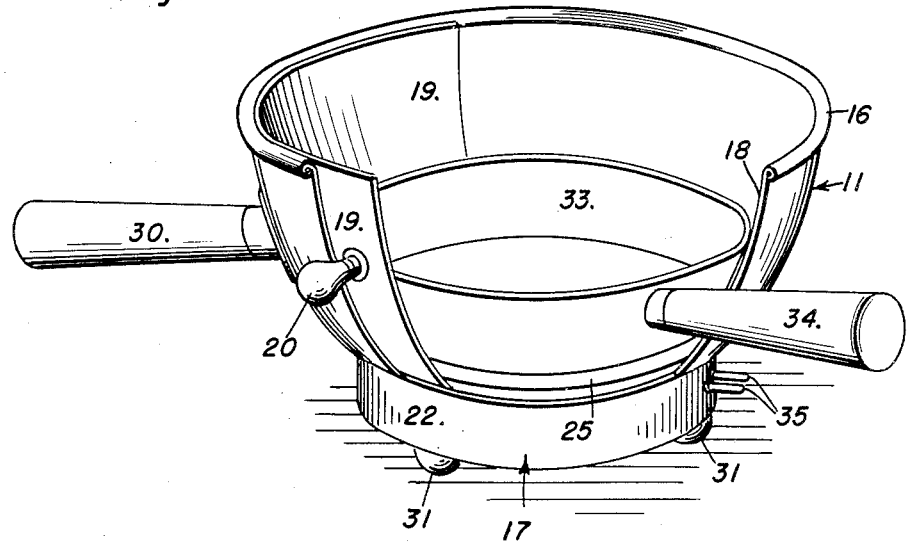
Figure 7 is a perspective view of the device with the top section removed from the lower section and inverted for use as a stove, with the door open and a cooking utensil such as a frying pan disposed therein with its handle projecting through the opening of the top section when the sliding door or panel is open.

The top section is provided with a handle 30 by which it may be held when mounted upon the bottom section or base 10, or removed therefrom and inverted, in which instance the portion 17 is supported upon a series, preferably three feet 31 in the form of balls equidistantly secured or formed upon the portion 17, so as to rest thereon when inverted in the manner shown in Figure 7 of the drawings, removed from the bottom section 10 and grates 15 thereof. The bottom section may also be provided with a pan or braces 32 disposed beneath the grate bars 15, all secured to the inner surface of the bottom section 10 at diametrically opposite points. In this way, when the device is in use as a broiler, as shown in Figures 1, 2 and 3, it is adapted to accommodate a cooking utensil with the article therein to be broiled, roasted or toasted, or placed directly upon the grate bars 15 for such purpose, and the sliding panel or door may be opened through the medium of its handle 20, to inspect the food being cooked so as to watch the broiling meat or bread being toasted without lifting the top, and also enables the user to turn over the meat or toast without lifting the top portion of the broiler from the bottom portion. The sliding panel or door, when opened, makes it possible to place therein small utensils such as frying pans, or the like, which would not be possible if there were no opening in the side wall.

Figure 8:
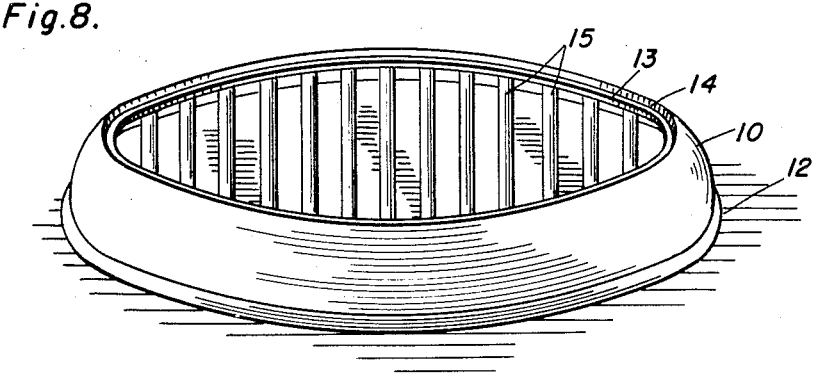
Figure 8 is a perspective view of the bottom section.

It will be noted that the resistance element or wire 28 is embedded in the material 29 and exposed at the bottom when the device is assembled as a broiler, but by reason of the top portion or section 11 being removable from the bottom of the section 10, the former may be removed and inverted in position, in the manner shown in Figure 7 of the drawings, resting upon the feet 31 with the heating element at the top and the door open, for use as an electric stove or hot plate for cooking purposes. In this position, the sliding door or panel 19 is shown open with the handle 20 limiting the movement thereof to an open position at one edge of the opening 18 and a frying pan or other cooking utensil 33 placed therein upon the heating element, with its handle 34 projecting through the opening 18, which would not be possible without the sliding panel or door. In this position, the device becomes a sort of an electric stove with a surrounding wall to prevent the contents of the pan or cooking utensil 33 from spattering, in addition to permitting frying, boiling and the like, as well as use of the device as a broiler when used as shown in Figures 1, 2 and 3, with the top portion or section 11 mounted upon the bottom section or base portion 10. It should also be noted that the circular portion 17 is provided with terminals 35, leading from the heating element 28, for connection with a socket or other connector plug 36 of a wire cable or extension cord 37 which may be connected to the wall socket of the house wiring, for supplying current to the heating element in either position and use of the device. It should be noted that the segmental top portion 21 of the sliding door or panel 19 is disposed beneath the portion 17 between the latter and heating element 25 at reduced projecting portion or bead 27 to rest on the latter in conjunction with the bottom edge of panel 19 resting on seat 13, or to simply extend therebetween and therefore precluded from view so that only the lateral portion of the door or panel 19 is exposed through the opening 18 when the parts are connected for use as a broiler. Thus, the heating element or hot plate is disposed beneath the portion 17 and also the wall 21 of the panel or door 19 with a space therebetween produced by the reduced central portion or bead 27 and the bolt 24 serving as a central axis on which the panel is turned while resting upon the latter portion in spaced relation to the top of the portion 17, as shown in Figure 2 of the drawings. The feet or balls 31 serve to support the heating element or hot plate in spaced relation to the supporting surface when the top section is removed and inverted for frying or other cooking purposes, as shown in Figure 7 of the drawings, leaving the base or bottom portion or section 10 separate, as shown in Figure 8 of the drawings, for further use when the top portion or section 11 is mounted thereon, as shown in Figures 1, 2 and 3 of the drawings at the seat 13. Also, the sliding door or panel, when open, permits the placing of utensils in the broiler when not in use and also makes it possible to watch the broiling meat or toast without lifting the top, as well as to turn over the meat or toast, and permits the handle of a cooking utensil, such as the frying pan 33, to project therethrough when open for use as an electric stove, as shown in Figure 7.

Thus, it will be seen that I have provided an extremely novel and simple broiler constructed in sections so that it may also be used as a cooking stove or hot plate with an electrical heating element, serving the several combined purposes conveniently, in addition to being economical to produce and efficient in use.

In view of the foregoing description taken in conjunction with the accompanying drawings, it is believed that a clear understanding of the device will be quite apparent to those skilled in this art. A more detailed description is, accordingly, deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An improved broiler comprising a bottom section having a surrounding seat at the top and a top section closed at the top and open at the bottom removably mounted directly on said seat, the bottom section having supporting grates below the seat and the top section having a heating element in the top spaced from the top and surrounding wall thereof and an opening in one side spaced from the top and extending through its bottom edge, and a closure for said opening, a central securing means securing the heating element at the center of the top section and on which said closure is mounted to turn to cover or uncover said opening in the top section, said top section being removable from the bottom section and adapted to be inverted to dispose the heating element at the bottom thereof for use as an electric stove to receive a cooking utensil or frying pan having a handle thereon for cooking purposes other than broiling, and the opening designed to permit the handle of the frying pan or utensil to extend therethrough when open.

2. An improved broiler comprising a base open at the top and having a depressed seat within and around the opening, a removable top section closed at the top and open at the bottom mounted at its bottom edge on the base at the seat, grates in the base beneath the seat to support articles to be broiled, the top section having an opening in its lateral wall or side tapering toward the top, a panel likewise tapering toward the top but larger than the opening, conforming in cross section to the top section and pivoted at the center thereof centrally to and beneath the top of the top section to open within the top section or to close said opening and having a handle projecting through said opening, a handle on the top section and a heating element within the top of the top section and mounted on said central pivot of the panel below the top portion of the latter and exposed downwardly for broiling purposes.

3. An improved broiler comprising a base, a removable top section mounted on the top edge of the base, grates fixed in the base below said top edge to support articles to be broiled, the top section having a central circular top portion and an opening in its lateral wall or side, a panel conforming in cross section to the top section and having a top portion pivoted at the center of the top portion of the top section to open within the top section or to close said opening and having a handle projecting through said opening, a handle on the top section and a heating element within and spaced from the top of the top section to receive the pivoted top portion of the panel therebetween and exposed downwardly for broiling purposes, the top portion of the top section being closed and having supporting feet, whereby when the top section is removed from the base, it may be inverted and mounted on the feet, to expose the heating element at the top within the side or lateral wall of the top section to receive cooking utensils thereon for frying or other purposes, with the door panel open so that the handle of such frying pan or cooking utensil may extend therethrough.

4. A broiler of the class described comprising a bottom section open at the top and bottom and having grates supported therein below the top for supporting articles for broiling, said bottom section having a seat at the inner edge of its top portion, a removable top section mounted upon said seat and closed at the top, an insulated heating unit supported from the closed top with its heating element facing downwardly and having a reduced central top projection, supporting feet on said top, adapted to support the top section in an inverted position when removed from the bottom section, said top section having a tapered side opening, a sliding door having a tapered top portion pivoted centrally to and within the top of the top section between the latter and the projection to close said opening and adapted to be opened for inspecting the food being broiled and the top section adapted to be inverted and mounted upon the feet with the heating element disposed upwardly for frying or other cooking purposes as an electric stove with the handle of a frying pan or other cooking vessel disposed on the heating element in the last position extending through the opening, and the heating element having means for connection with a source of current supply and mounted within the top section to movably support the panel at its axial center thereon.

5. A broiler of the class described comprising a bottom section having a surrounding seat at the top, grates across the bottom section beneath said seat, a top section removably mounted upon said seat and open at the bottom, said bottom section being open at the top and bottom, the top of the top section being closed, a panel also mounted on and slidable upon said seat and adapted to cover and uncover an opening in the side of the top section and provided with a handle projecting through said opening by which it may be slid, a heating element mounted centrally from the top and center of the top section and adapted to pivotally mount the sliding panel thereon at the center to turn and having means for connection with a cable for supplying current to the heating element thereof and provided with feet at the top adapted, when the top section is inverted, to dispose the heating element at the bottom with the side of the top section projecting upwardly therefrom for receiving a frying pan or other cooking utensil therein on the heating element with its handle extending through the opening when the panel is open.

6. A broiler comprising an annular bottom section open at the top and bottom and having a depressed seat around the inside of its top edge in the form of an annular flange, grate bars supported across the bottom section beneath said seat, a removable top section of concavo-convex cross section tapering toward the top and having an open bottom with an outwardly directed bottom flange resting on the seat, the top of the top section being provided with a flat annular circular portion with a depending flange forming a lateral wall and having a segmental opening therebeneath extending through the bottom edge of the top section, supporting feet on said top adapted to support the top section in an inverted position when removed from the bottom section, a sliding door of segmental form having a tapered top portion and a lateral wall portion fitting within the lateral wall of the top section with the tapered top portion extending beneath the top thereof and provided with an opening at its apex, a heating unit having a bottom heating element and a central top projection, a bolt centrally securing said heating unit to the center of the top section through said opening on which said door is adapted to turn in sliding engagement with the seat to uncover and cover the opening in the top section, a handle on the door limiting the opening and closing movements thereof between the opposite edges of the opening in the top section, a handle on the top section at one side of the opening therein and terminals on the heating element extending through the lateral wall of the top section for connection with a terminal socket of an extension cable, said top section when removed and inverted designed to receive a cooking vessel therein with its handle projecting through the opening uncovered by the door and permitting the door to be moved to a substantially closed position.

7. An electric broiler comprising a bottom section having a grate mounted within and below the top of the same, and a cover-like top section seated on the top of said bottom section and having an electric heating element mounted within the top thereof, said top section being provided with supporting feet and being removable from said bottom section for use as a stove when inverted, said top section including a main part having a handle and provided at one side with a relatively large opening adapted to permit turning of food in the broiler or to admit a frying pan or like utensils therethrough without lifting said top section, and a door movable to open and close said opening and carried by said main part.

ROBERT SPIGEL.

REFERENCES CITED

The following references are of record in the file of this patent:

UNITED STATES PATENTS

| Number | Name | Date |
|---|---|---|
| 160,467 | Zuackenbush | Mar. 2, 1875 |
| 449,144 | Tommins | Mar. 31, 1891 |
| 2,135,318 | Barkinsky et al. | Nov. 1, 1938 |
| 2,148,822 | Kolouch | Feb. 28, 1939 |
| 2,183,866 | Hutchens et al. | Dec. 19, 1939 |